US012644765B2

(12) United States Patent　　(10) Patent No.:　US 12,644,765 B2
Bates　　(45) Date of Patent:　Jun. 2, 2026

(54) LASER ASSESSMENT INSTRUMENT

(71) Applicant: Evan Manley Bates, Fredericksburg, VA (US)

(72) Inventor: Evan Manley Bates, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 89 days.

(21) Appl. No.: 18/908,514

(22) Filed: Oct. 7, 2024

(65) Prior Publication Data

US 2026/0098755 A1　　Apr. 9, 2026

(51) Int. Cl.
*G01J 1/42*　　(2006.01)
*F41H 13/00*　　(2006.01)
*G01J 1/02*　　(2006.01)
*G01J 1/44*　　(2006.01)

(52) U.S. Cl.
CPC .......... *G01J 1/4257* (2013.01); *F41H 13/005* (2013.01); *G01J 1/0271* (2013.01); *G01J 2001/4247* (2013.01); *G01J 2001/446* (2013.01)

(58) Field of Classification Search
CPC ................... G01J 1/4257; G01J 1/0271; G01J 2001/4247; G01J 2001/446; F41H 13/005
USPC ......................................................... 356/213
See application file for complete search history.

(56) References Cited

U.S. PATENT DOCUMENTS 6,528,954 B1 *　3/2003　Lys ........................ H05B 45/46
　　　　　　　　　　　　　　　　　　　315/158
2018/0156660 A1 *　6/2018　Turgeon .................... G01J 1/44

\* cited by examiner

*Primary Examiner* — Md M Rahman
(74) *Attorney, Agent, or Firm* — Gerhard W. Thielman

(57) ABSTRACT

An instrument measurement package is provided for assessing response effect from laser illumination onto a target. The package includes a photodiode, a circuit board, an illumination indicator, an enclosure and a battery. The photodiode measures the laser illumination as an incidence signal. The circuit board accommodates a power relay, a microprocessor, a clock and a flash memory card for recording the incidence signal. The illumination indicator displays a result from the incidence signal by activation. The enclosure contains the circuit board and mounts the photodiode. The battery supplies direct current voltage to the circuit board via the power relay.

20 Claims, 5 Drawing Sheets

LASER ASSESSMENT INSTRUMENT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to measurement devices. In particular, the invention relates to laser incidence instruments for assessing damage to a target test article from such exposure.

SUMMARY

Conventional measurement packages yield disadvantages addressed by various exemplary embodiments of the present invention. In particular, various exemplary embodiments provide an instrument measurement package for assessing response effect from laser illumination onto a target. The package includes a photodiode, a circuit board, an illumination indicator, an enclosure and a battery. The photodiode measures the laser illumination as an incidence signal.

The circuit board accommodates a power relay, a microprocessor, a clock and a flash memory card for recording the incidence signal. The illumination indicator displays a result from the incidence signal by activation. The enclosure contains the circuit board and mounts the photodiode. The battery supplies direct current voltage to the circuit board via the power relay. Other various embodiments additionally provide for the indicator being a halogen light that can activate either in flash mode or continuously.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

The disclosure generally employs quantity units with the following abbreviations: length in meters (m), mass in grams (g), time in seconds(s), angles in degrees (°), force in newtons (N), temperature in kelvins (K), energy in joules (J), power in watts (W), potential in volts (V) and frequencies in hertz (Hz). Supplemental measures can be derived from these, such as density in grams-per-cubic-centimeters ($g/cm^3$), moment of inertia in gram-square-centimeters ($kg\text{-}m^2$) and the like.

Figure 1:
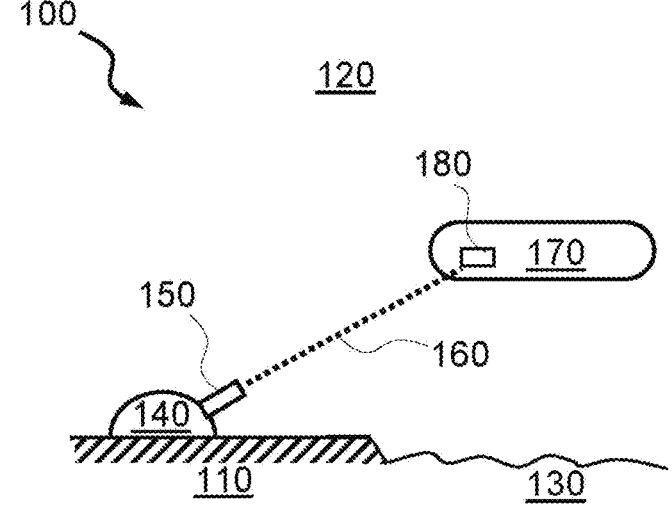
FIG. 1 is a block diagram view of an operational test scenario.

FIG. 1 shows a block diagram view 100 of an environment scenario in context of exemplary embodiments. Operations can be conducted on land 110, in air 120 and at sea 130. A platform 140 points a laser emitter 150 (such as a weapon) that emits a coherent beam 160 towards a target 170 (aerial in this example). An exemplary instrument 180 as a lethality assessment package is installed on the target 170 to measure energy from the beam 160 for test and/or calibration purposes.

The exemplary laser assessment instrument 180 is referred to herein as a "lethality package" as regards to performance evaluation of a laser weapon 150. The exemplary instrument 180 has the purpose of providing both real-time qualitative and post-test quantitative data for assessing performance specifications of a laser weapon system 150 when conducting live-fire engagements to a static or dynamic target 170.

The lethality performance of a laser weapon system 150 is assessed during open-air test and evaluation events. There are a wide range of targets 170 and materials located down range for a system under test (SUT) in view 100. Additionally, test scenarios engagements are conducted dynamically or statically to the ground 110, air 120, or sea 130 from either the ground 110, air 120, or sea 130.

Therefore, system performance is graded based on qualitative data consisting of visual inspection and photographs of the target 170 or material after the test scenario has concluded. Qualitative inspection post engagement impedes testing depending on the location and type of the target 170 or material. Quantitative data, such as dwell time, is collected using the visual tracking subsystem of the SUT. Dwell time is the time duration from beam's incidence to defeat of the target 170 and is qualitatively estimated by analyzing video playback of engagement by the laser 150. Consequently, measurement accuracy is affected depending on the playback quality and clarity of the target 170 within the video scene.

The lethality package 180 is an instrument system mounted on or near a target 170 to provide real-time qualitative feedback when the target 170 or material is defeated by flashing a halogen light 240 (FIG. 2) and to collect laser dwell time data during the engagement. The flashing halogen 240 indicates a confirmed defeat of the target 170 to the system's operator without interrupting operations or halting the test scenario.

Figure 2:
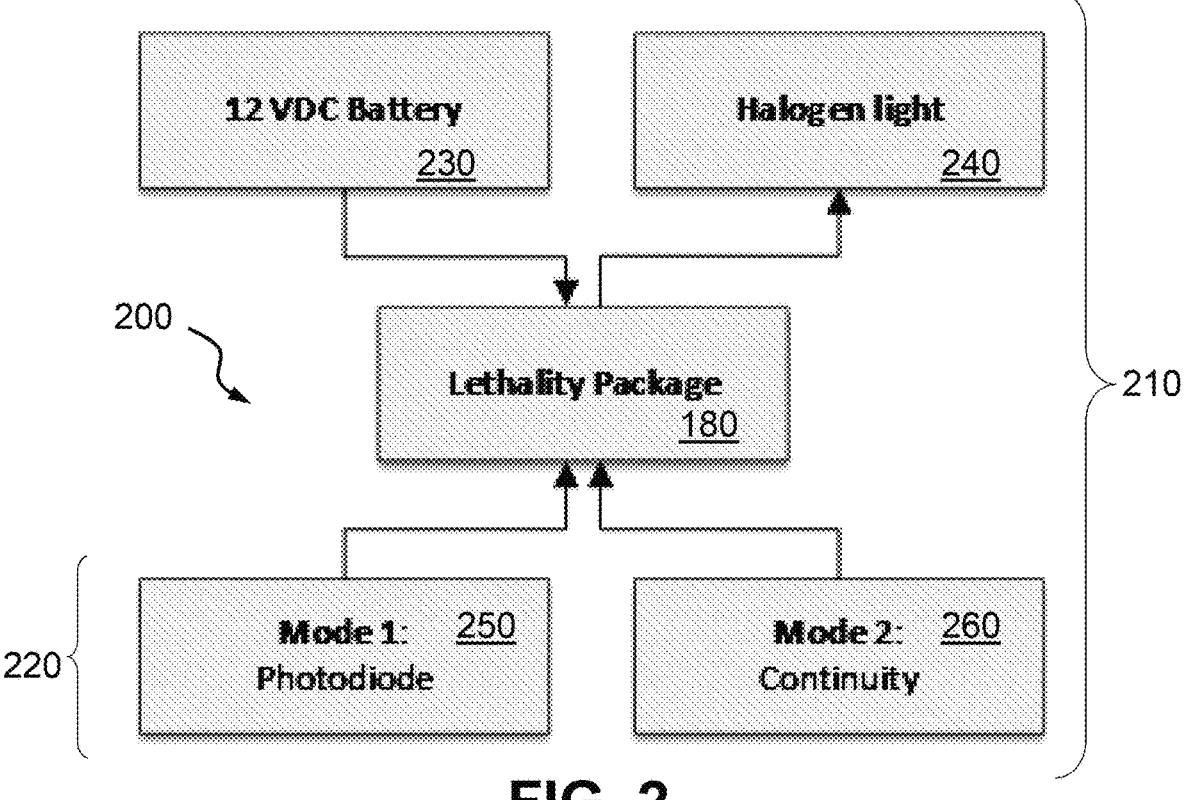
FIG. 2 is a block view of equipment for an exemplary package.

Laser dwell time data are recorded to an SD card 344 (FIG. 3) inside the instrument 180 as the lethality package and is collected for analysis post-test. The lethality package 180 constitutes a standalone system and does not need any external control or monitoring, being powered using a direct current 12 $V_{DC}$ battery 230 (FIG. 2). Additionally, the lethality package 180 is independent of the target model 170 and the low-profile form factor does not influence the target's appearance with respect to the SUT tracking imagery.

FIG. 2 shows a block diagram view 200 of scenario equipment 210 for the lethality package 180 with a pair of modes 220. These items include a 12 $V_{DC}$ battery 230 and a halogen light 240. The modes 220 accommodate two different target types: larger targets indicated by intermittent display and smaller targets by continuous display.

Mode one operation 250 utilizes large-area silicon photodiodes mounted internally and externally on the target 170 or test material. The lethality package 180 continuously collects signals from the photodiodes to determine when the laser 150 turns on and when the target 170 or material is defeated, i.e., when the laser beam 160 penetrates through the target 170 or material.

Mode two operation 260 utilizes conducting leads to measure the electrical continuity of the target 170 or material. When the SUT in view 100 breaks the target's continuity, the lethality package 180 flashes the halogen light 240 periodically for one minute (60 s). The dwell time is measured using the response from a photodiode 745 (FIG. 7) in mode one 250 until continuity breaks. Mode two 260 is used for smaller targets 170 experiencing catastrophic failure. The only changes in the lethality package 180 between modes are the microprocessor code and the external sensors connected to the lethality package 180. The internal hardware to the lethality package 180 remains unchanged.

Figure 3:
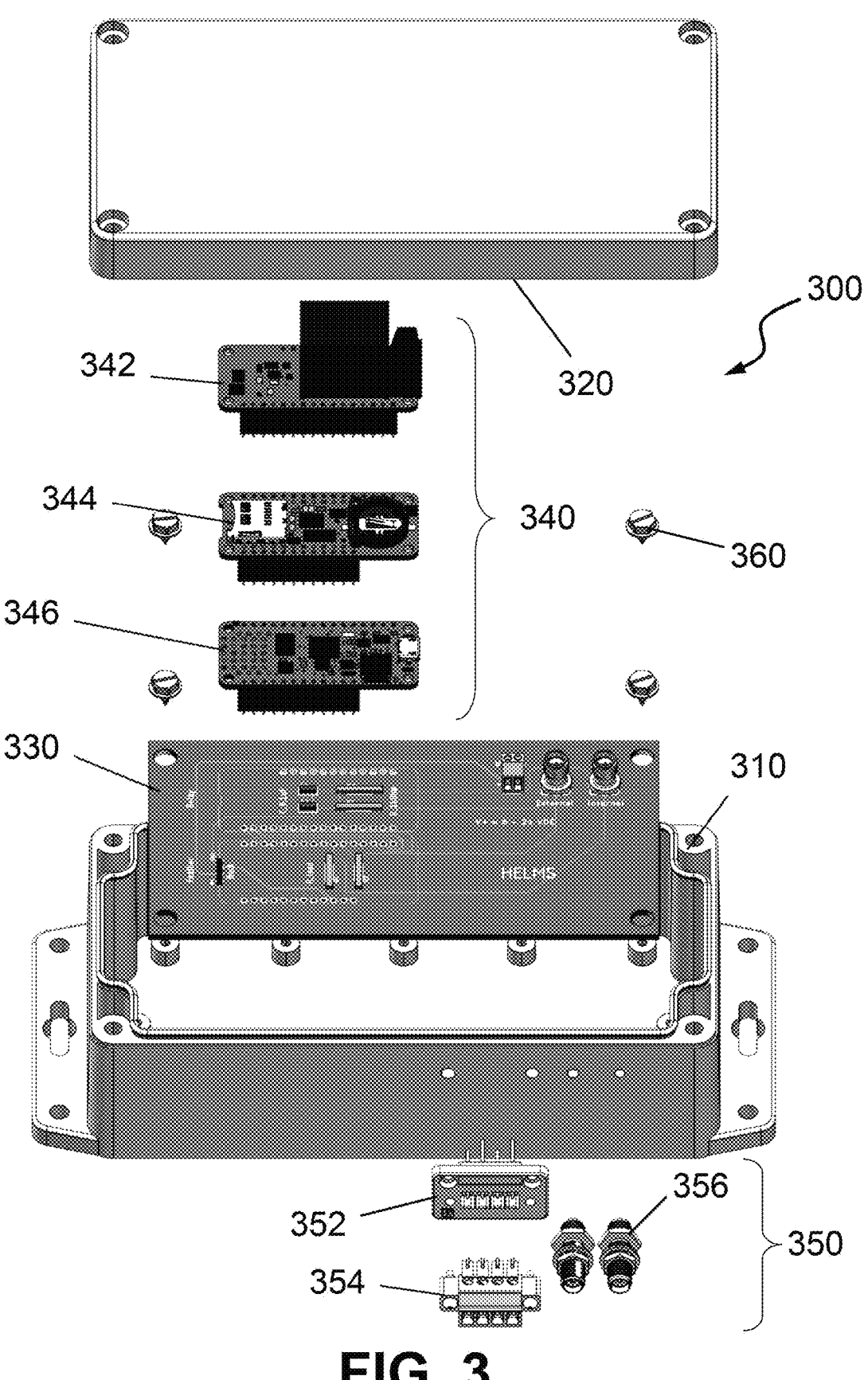
FIG. 3 is an exploded view of components for the package.

FIG. 3 shows an exploded view 300 of the lethality package design. The design for the package 180 comprises custom and commercially-off-the-shelf (COTS) components. An enclosure 310 sealed by a cover 320 contains a main printed circuit board (PCB) 330 along with integrated circuit components 340 as power relay, clock, flash memory and microcontroller.

In particular, these include an Adafruit Power Relay FeatherWing 342, Adalogger real-time clock, Adafruit Secure Digital (SD) flash memory card FeatherWing 344, and an Adafruit Feather MO Express microcontroller 346 within the weatherproof enclosure 310. The Adafruit COTS modules are designed to be replaceable on the main PCB 330, which also comprises the power supply input and sensor measurement circuitry.

Connector components 350 mount to the enclosure 310. These include an interface block 352, a screw terminal block 354 and coaxial cable plugs 356. The lethality package 180 was designed for connection to the 12 $V_{DC}$ battery 230 and the 12 $V_{DC}$ halogen bulb 240 through the screw terminal block 354. The enclosure 310 also receives subminiature version A (SMA) cable jacks 356. The PCB 330 attaches to the enclosure 310 via screws 360.

In response to defeat of the target 170, the lethality package 180 flashes a 50 W-12 $V_{DC}$ halogen light bulb 240 for one minute. The response signals, time, and date from the photodiode 745 are saved to a .csv file on the SD card 344 inside the lethality package's enclosure 310. Mode one 250 is used for target 170 and materials with large surface areas. The SD card 344 also saves dwell time for mode two 260.

Figures 4, 5:
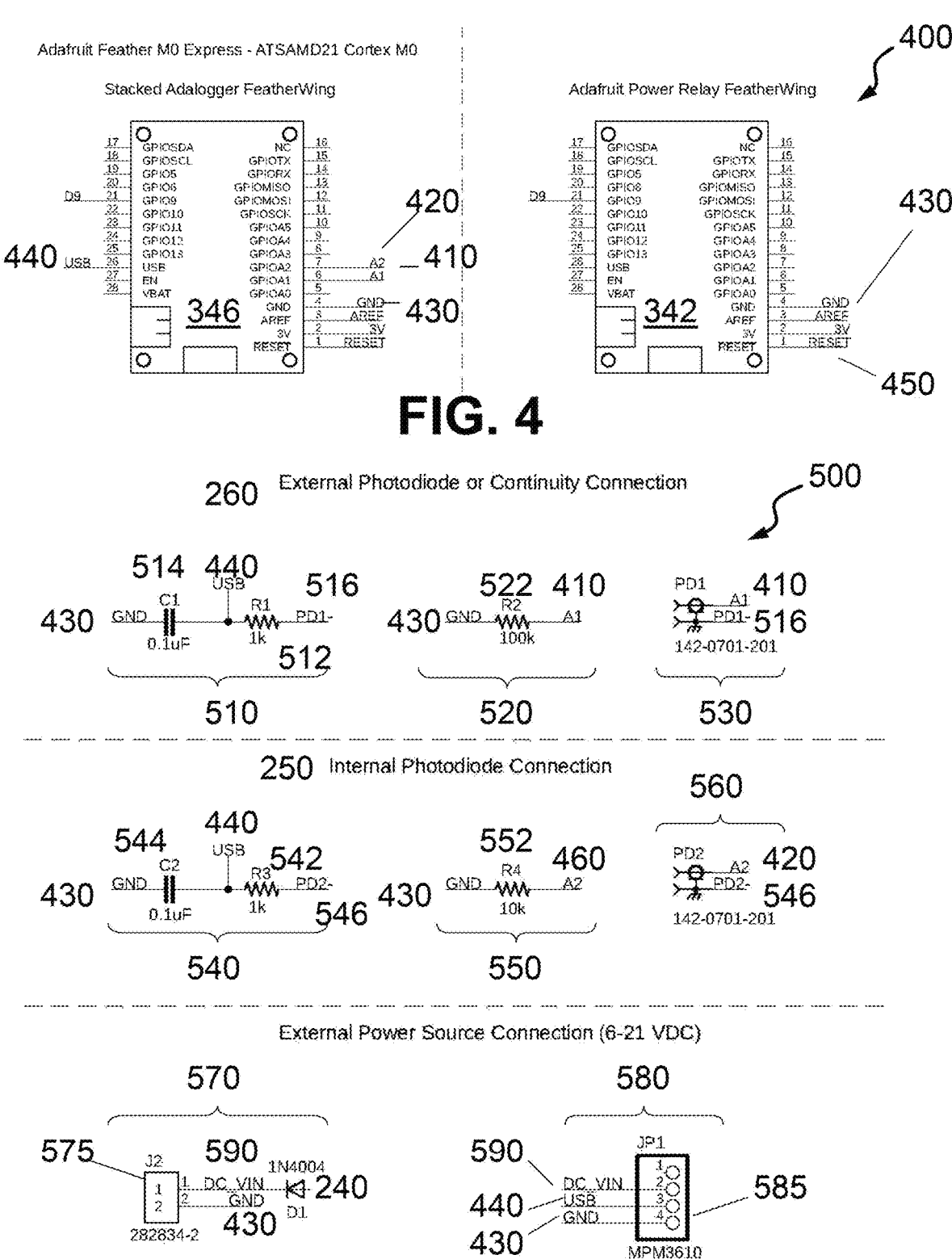
FIG. 4 is a schematic view of processor components.
FIG. 5 is a schematic view of sub-circuit components.

FIG. 4 shows schematic views 400 of Adafruit circuits: in particular the microcontroller 346 and the power relay 342. The microcontroller 346 includes pin connectors A1 410 and A2 420, as well as ground (GND) 430 and universal serial bus (USB) 440. The power relay 342 includes ground 430 and reset 450.

FIG. 5 shows schematic views 500 of sub-circuit components as connections for the modes 250 and 260 and an external power source. Mode two 260 includes a first connection 510 having a 1 kΩ resistor R1 512, a 0.1 μF capacitor C1 514 and a PD1—connector 516; a second connection 520 with a 100 kΩ resistor 522 and a third connection 530. The first connection 510 features a series circuit with ground 430, the capacitor 514, a USB 440, the resistor 512 and the connector 516. The second connection 520 features a series circuit with ground 430, the resistor 522 and connector A1 410. The third connection 530 includes the connectors 410 and 516.

Mode one 250 includes a fourth connection 540 with a 1 kΩ resistor R2 542, a 0.1 μF capacitor C2 544 and a PD2—connector 546; a fifth connection 550 with a 10 kΩ resistor R4 552; and a sixth connection 560. The fourth connection 530 features a series circuit with ground 430, the capacitor 544, a USB 440, the resistor 542 and the connector 546. The fifth connection 550 features a series circuit with ground 430, the resistor 552 and connector A2 420. The sixth connection 560 includes the connectors 420 and 546. The external power source connection includes a seventh connection 570 with junction J2 575 and an eighth connection 580 as a DC buck converter with junction JP1 585, each connected to DC voltage input 590. The power connectors 516 and 546 connect to the SMA jacks 356.

Figures 6A, 6B:
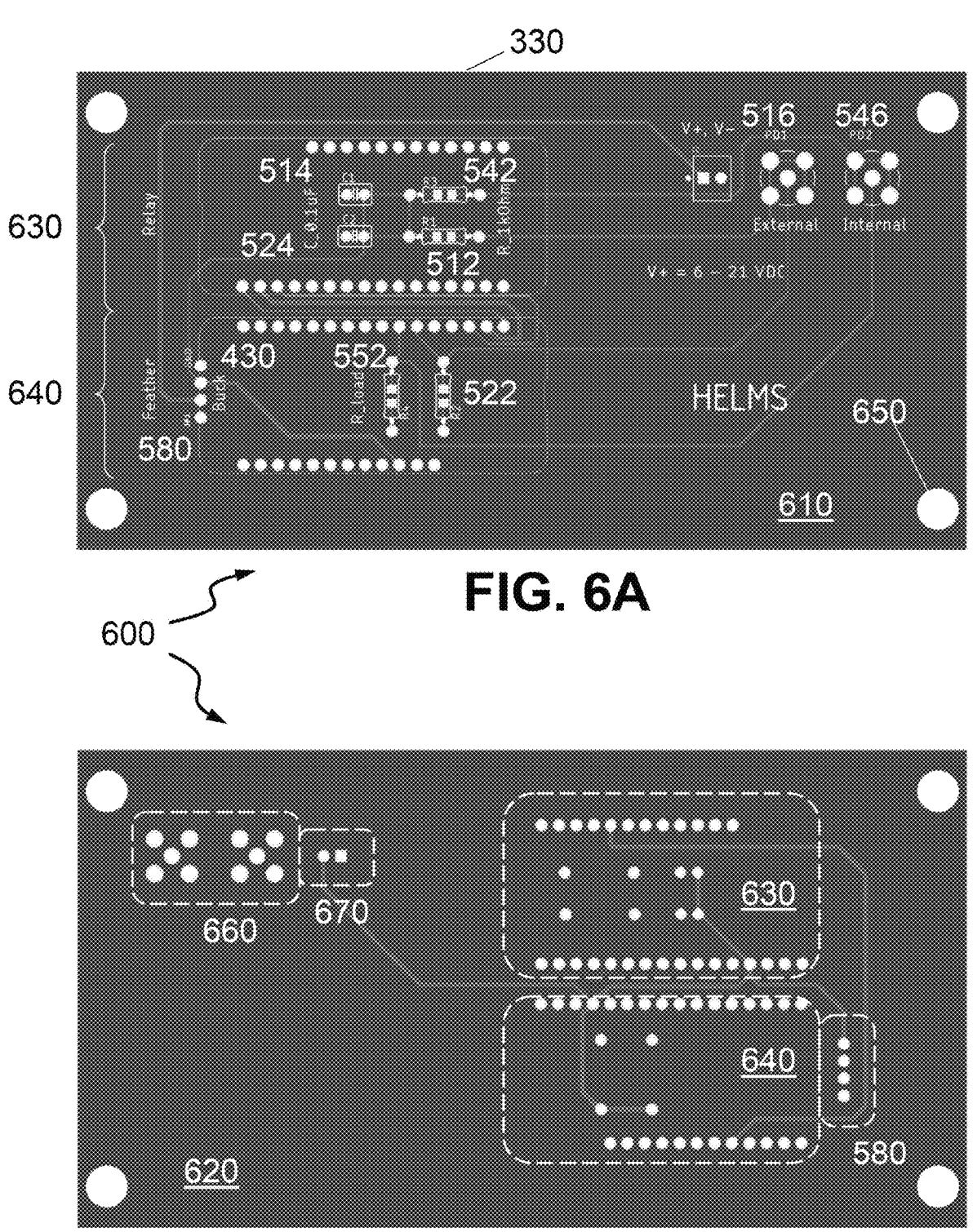
FIGS. 6A and 6B are plan views of the circuit board.

FIGS. 6A and 6B show schematic views 600 of layout for the main PCB 330 with obverse 610 and reverse 620 sides. The obverse side 610 shows a relay portion 630 of pins for the first, second and fourth connectors 510, 520 and 540, and a feather portion 640 of pins for the second and fifth connectors 520 and 550. The screws 360 pass into the corner holes 650 for attaching to the enclosure 310. Power includes external PD1 516 and internal PD2 546 attachments among the power pins 660 identified on the reverse side 620, together with voltage inversion pins 670. Both sides 610 and 620 further identify the buck converter 580 that includes pins for ground 430 and JP1 585.

The DC-DC buck converter 580 downscales the input voltage 590 to 3.3 Vpc to power the microcontroller 346. The 12 $V_{DC}$ potential from the battery 230 passes directly to the non-latching relay J2 575 for controlling power to the halogen light 240. The sensor circuitry measures the voltage over resistors 512, 522, 542 and 552 in either mode one 250 or two 260 using the analog inputs on the microcontroller 346. The two analog measurements, time, and date are recorded to the .csv file on the SD card 344 continuously when the package 180 is powered on.

Figure 7:
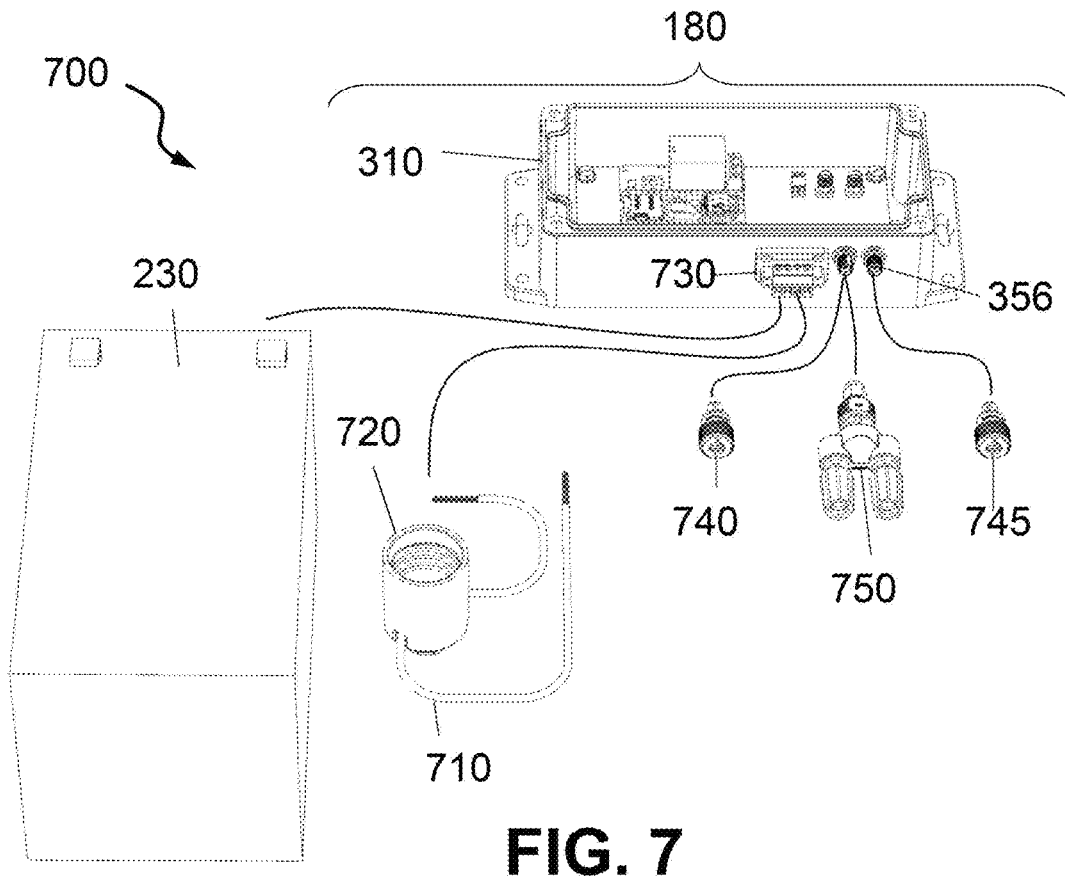
FIG. 7 is a block diagram view of components connected to the package.

FIG. 7 shows a representative view 700 of the ancillary equipment and sensors for the package 180. The 12 $V_{DC}$ battery 230 and wire leads 710 to a socket 720 for the halogen light 240 connect to the screw terminal 730 mounted on the lethality package's enclosure 310. An external photodiode 740 or an SMA to Bayonet Neill-Concelman

5

(BNC) binding post 750 connects to an SMA jack 356 on the enclosure 310 depending on the operating mode. The internal or external photodiode 745 connects to the SMA jack 760 for mode one 250 or two 260 respectively.

Figure 8:
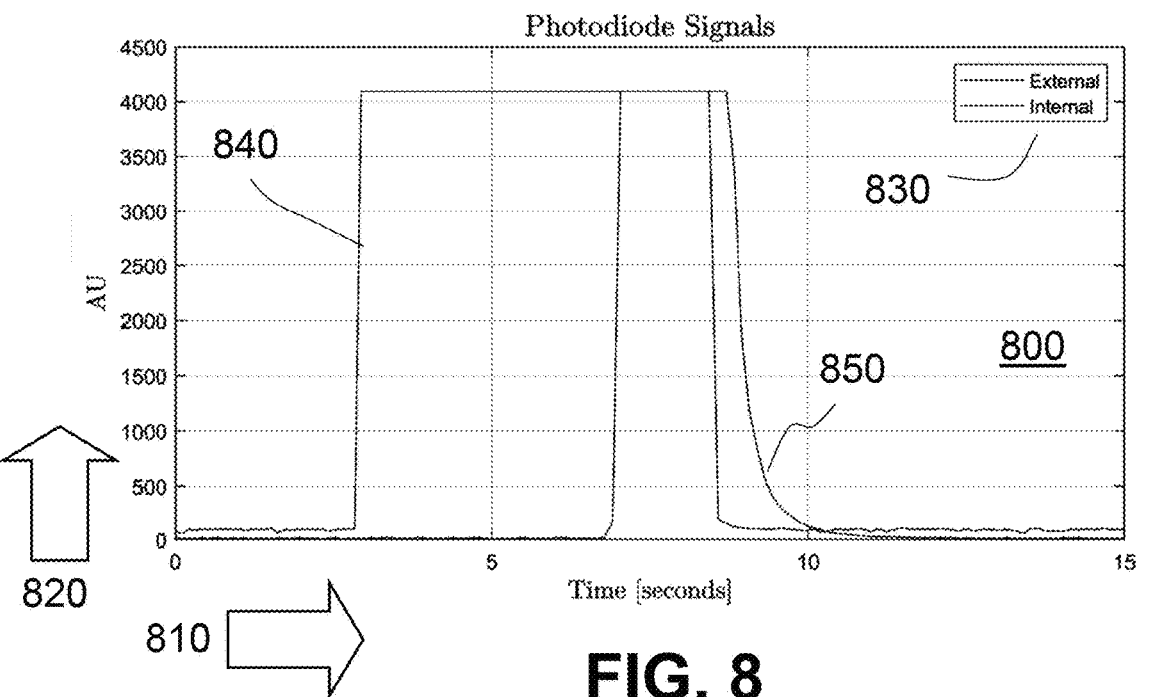
FIG. 8 is a graphical view of a response plot to test illumination.

FIG. 8 shows a graphical view 800 of a dwell response plot. Time 810 in seconds(s) denotes the abscissa, while photodiode amplitude 820 in arbitrary units (AU) denotes the ordinate. A legend 830 distinguishes external 840 and internal 850 traces. The external trace 840 steps up to above 4k AU at 2.6 s and drops at 8.5 s. The internal trace 850 responds to the external trace 830 by rising at 7 s before trailing dropoff at 9 s. This brief response lag enables accurate evaluation of effectiveness of the laser 150 against the target 170.

Two custom scripts were coded for the separate operating modes one and two. Depending on the test scenario, the correct script is uploaded to the microcontroller 346 before executing the test event. Scripts have been written in C++ using the Arduino integrated development environment (IDE) software and with publicly available libraries.

The lethality package 180 provides exemplary real-time situational awareness on target 170 or material defeat down range for laser weapon systems 150. The lethality package 180 also provides measured data, locally saved to assess dwell time needed to defeat the target 170 or material as shown in view 800. The lethality package 180 is standalone and does not require an operator after initial setup. Its low-profile does not interfere with target 170 or material geometry in the SUT's field-of-view (FOV). Lastly, the package's components and fabrication are low cost and readily available if the lethality package 180 is lost or damaged during a test scenario.

Targets 170 or materials are visually inspected to assess lethality. Photographs and videos are captured before, during, and after engagements. Dr. Evan Bates: Circuit design, PCB design, mechanical design, Software development, component selection, prototype fabrication. The lethality package 180 was developed in response to future test requirements from the airborne high laser energy (AHEL) program. A total of twenty-one units have been developed for the program. Other directed energy programs have expressed interested in the lethality package instrument 180.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An instrument measurement package for assessing response effect from laser illumination onto a target, said package comprising:
   a photodiode for measuring the laser illumination as an incidence signal;
   a circuit board that accommodates a power relay, a microprocessor, a clock and a flash memory card for recording said incidence signal;
   an illumination indicator for displaying response from said incidence signal by activation, wherein said response denotes one of dwell time measurement and broken continuity from the laser illumination;
   an enclosure for containing said circuit board and mounting said photodiode; and
   a battery for supplying direct current voltage to said circuit board via said power relay.

2. The package according to claim 1, wherein said illumination indicator comprises a halogen light.

3. The package according to claim 2, wherein said halogen light activates by one of periodic flash mode and continuous mode.

4. The package according to claim 1, wherein said battery has 12 $V_{DC}$ potential.

5. The package according to claim 1, wherein said flash memory card complies with Secure Digital format.

6. The package according to claim 1, wherein said photodiode is mounted at least one of internally and externally to said enclosure.

7. The package according to claim 1, wherein said photodiode is mounted externally to said enclosure.

8. The package according to claim 1, wherein said photodiode is mounted internally to said enclosure.

9. The package according to claim 1, wherein said flash memory card stores said response from said photodiode, and time and date from said clock.

10. The package according to claim 9, wherein a .csv file stores said response, said time and said date in said flash memory card.

11. The package according to claim 9, wherein said response, said time and said date are analog.

12. The package according to claim 1, wherein said illumination indicator activates in periodic flash mode.

13. The package according to claim 1, wherein said illumination indicator activates in continuous mode.

14. The package according to claim 1, wherein said enclosure further includes a cover and is weatherproof.

15. An instrument measurement package for assessing response effect from laser illumination onto a target, said package comprising:
   a photodiode for measuring the laser illumination as an incidence signal;
   a circuit board that accommodates a power relay, a microprocessor, a clock and a flash memory card for recording said incidence signal;
   an illumination indicator for displaying a response from said incidence signal by activation, wherein said response denotes dwell time measurement from the laser illumination;
   an enclosure for containing said circuit board and mounting said photodiode; and
   a battery for supplying direct current voltage to said circuit board via said power relay.

16. The package according to claim 15, wherein said flash memory card stores said response from said photodiode, and time and date from said clock.

17. The package according to claim 15, wherein said illumination indicator activates in periodic flash mode.

18. An instrument measurement package for assessing response effect from laser illumination onto a target, said package comprising:
   a photodiode for measuring the laser illumination as an incidence signal;
   a circuit board that accommodates a power relay, a microprocessor, a clock and a flash memory card for recording said incidence signal;
   an illumination indicator for displaying a response from said incidence signal by activation, wherein said response denotes broken continuity from the laser illumination;
   an enclosure for containing said circuit board and mounting said photodiode; and
   a battery for supplying direct current voltage to said circuit board via said power relay.

19. The package according to claim 18, wherein said flash memory card stores said response from said photodiode, and time and date from said clock.

20. The package according to claim 18, wherein said illumination indicator activates in continuous mode.

\* \* \* \* \*